US012110093B2

(12) United States Patent
Orteu et al.

(10) Patent No.: US 12,110,093 B2
(45) Date of Patent: Oct. 8, 2024

(54) AIRCRAFT COMPRISING ARTICULATED RAILS INTEGRATED INTO THE FLOOR OF A CABIN

(71) Applicant: Airbus Operations (S.A.S.), Toulouse (FR)

(72) Inventors: Benoit Orteu, Toulouse (FR); Ludovic Mil, Toulouse (FR); Lionel Laganier, Toulouse (FR); Dominique Marty, Toulouse (FR); Philippe Robert, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 107 days.

(21) Appl. No.: 17/982,999

(22) Filed: Nov. 8, 2022

(65) Prior Publication Data
US 2023/0141505 A1    May 11, 2023

(30) Foreign Application Priority Data
Nov. 9, 2021   (FR) ........................................ 2111903

(51) Int. Cl.
*B64C 1/20*    (2006.01)
(52) U.S. Cl.
CPC ...................... *B64C 1/20* (2013.01)
(58) Field of Classification Search
CPC ...... B64C 1/20; E04F 15/02005; E04F 15/16; E04F 2015/02122; E04F 2015/02088; E04F 11/16; E04F 11/163; E04F 11/166
See application file for complete search history.

(56) References Cited

U.S. PATENT DOCUMENTS

| 8,317,133 | B2 | 11/2012 | Nolla |
| 9,199,719 | B2* | 12/2015 | Durand ..................... B64C 1/26 |
| 2010/0264267 | A1* | 10/2010 | Barauke ................... B64C 1/20 |
|  |  |  | 244/118.1 |
| 2015/0108273 | A1 | 4/2015 | Oleson |
| 2020/0088225 | A1 | 3/2020 | Brindeau et al. |
| 2021/0061484 | A1 | 3/2021 | Lawyer |
| 2021/0310853 | A1* | 10/2021 | Kochanowski ...... B65D 88/522 |

FOREIGN PATENT DOCUMENTS

| EP | 2 881 238 A1 | 6/2015 |
| FR | 2 913 400 A1 | 9/2008 |

OTHER PUBLICATIONS

French Search Report for Application No. 2111903 dated May 31, 2022.

* cited by examiner

*Primary Examiner* — Brady W Frazier
*Assistant Examiner* — Shanna Danielle Glover
(74) *Attorney, Agent, or Firm* — KDW Firm PLLC

(57) ABSTRACT

An aircraft including a floor positioned above a central wing box and in a front fuselage portion positioned in front of the central wing box. The floor includes at least one rail which has at least first and second rail portions and at least one articulation connecting the first and second rail portions and configured to allow a pivoting movement, about a transverse and horizontal pivot pin, between the connected first and second rail portions. By virtue of this articulation, it is possible to integrate the rails into the floor and not to position them on the floor.

10 Claims, 9 Drawing Sheets

AIRCRAFT COMPRISING ARTICULATED RAILS INTEGRATED INTO THE FLOOR OF A CABIN

TECHNICAL FIELD

The subject matter herein relates to an aircraft comprising articulated rails integrated into the floor of a cabin.

BACKGROUND

According to one embodiment, an aircraft comprises a fuselage, wings and a central wing box that is positioned in the lower part of the fuselage and connects the wings to the fuselage. In the case of an aircraft intended to transport cargo, the fuselage comprises a cabin which is positioned above the central wing box and in which the containers can be stored. This cabin may comprise a floor equipped with rails on which the containers can roll. For the present application, a cabin is understood to be a cabin or a hold.

According to one embodiment, the floor is a load-bearing structure configured to adapt to the movements and/or deformations between the central wing box and the fuselage portion situated in front of the central wing box. The rails are attached to the floor. This configuration is not satisfactory since it tends to reduce the available height between the rails and the ceiling of the cabin.

SUMMARY

The disclosure herein aims to overcome all or some of the drawbacks of the prior art.

To this end, the subject of the disclosure herein is an aircraft comprising a floor positioned above a central wing box and in a front fuselage portion positioned, along a longitudinal direction, in front of the central wing box, the floor comprising at least one rail which extends along the longitudinal direction and has at least one core.

According to the disclosure herein, the rail comprises at least first and second rail portions, at least one articulation connecting a first end of the core of the first rail portion and a second end of the core of the second rail portion, the articulation comprising at least one splice plate which has first and second ends, a pivot pin oriented perpendicularly to the longitudinal direction, passing through the first end of the core of the first rail portion and the first end of the splice plate, and at least one first complete link connecting the second end of the core of the second rail portion and the second end of the splice plate.

This solution allows the rails to adapt to the movements and/or deformations between the different portions of the fuselage. Consequently, the rail can be integrated into the floor, making it possible, in the case of a floor of a cabin, to optimize the available height between the rails and the ceiling of the cabin.

According to another feature, each articulation comprises first and second splice plates positioned on either side of the core of each of the first and second ends of the first and second rail portions, the first and second splice plates having first ends through which the pivot pin passes and second ends connected by at least one complete link to the second end of the core of the second rail portion.

According to another feature, the core of each of the first and second ends of the first and second rail portions comprises first and second faces. In addition, each articulation comprises a backplate pressed against the first face of the first end of the core of the first rail portion and connected to this first end by a complete link; the first end of the first splice plate being pressed against the backplate; the second end of the first splice plate being pressed against the first face of the second end of the core of the second rail portion and connected to this second end by a complete link; the first end of the second splice plate being pressed against the second face of the first end of the core of the first rail portion; the second end of the second splice plate being pressed against the second face of the second end of the core of the second rail portion and connected to this second end by a complete link; the pivot pin passing through the first end of the core of the first rail portion, the backplate and the first ends of the first and second splice plates.

According to a feature, the first splice plate comprises a step between its first and second ends, in order to accommodate the backplate.

According to another feature, the rail comprises a horizontal plate which has an upper face on which the core is positioned. In addition, the first splice plate comprises first and second wings that form an angle of around 90° and are produced integrally, the first wing having a first end pressed against the backplate and a second end pressed against the first face of the second end of the core of the second rail portion, the second wing being pressed against the horizontal plate and connected to the latter by connecting elements.

According to another feature, the rail comprises two cores and first and second articulations, one for each core, which are symmetric with respect to a median plane parallel to the two cores and positioned equidistantly from the two cores.

According to another feature, the second wings of the first splice plates of the first and second articulations are positioned between the two cores.

According to another feature, the rail comprises a front rail portion, an intermediate rail portion, a rear rail portion, at least one front articulation connecting the front rail portion and the intermediate rail portion, and at least one rear articulation connecting the intermediate rail portion and the rear rail portion, the front and rear articulations being symmetric with respect to a transverse plane situated equidistantly from the front and rear rail portions.

According to another feature, the rail comprises a front rail portion connected to the front fuselage portion and a rear rail portion connected to the central wing box.

According to another feature, the floor comprises a plurality of rails spaced apart along a transverse direction perpendicular to the longitudinal direction, and horizontal panels supported by the rails, the latter delimiting between one another spaces closed off by the horizontal panels.

BRIEF DESCRIPTION OF THE DRAWINGS

Further features and advantages will become apparent from the following description of the disclosure herein, which is given solely by way of example, with reference to the appended drawings, in which.

DETAILED DESCRIPTION

Figure 1:
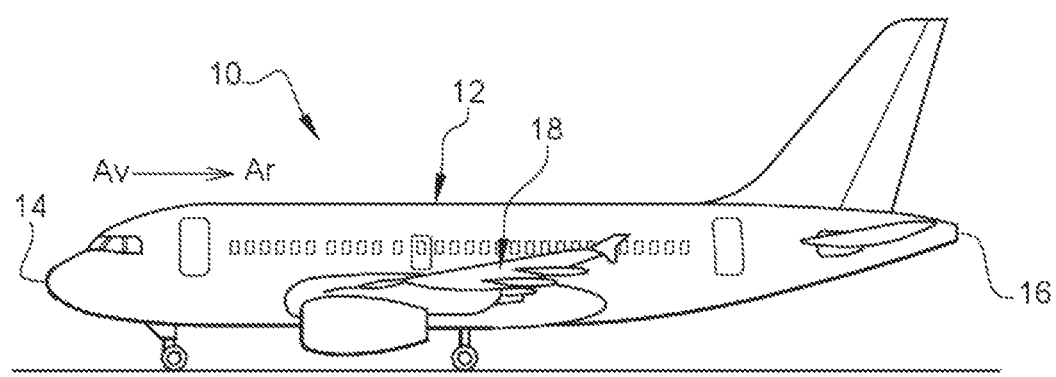
FIG. 1 is a side view of an aircraft.

As illustrated in FIG. 1, an aircraft 10 comprises a fuselage 12 that extends between a nose 14 and a tail cone 16, and wings 18 that are disposed on either side of the fuselage 12 and connected to the latter by a central wing box 20.

For the remainder of the description, a longitudinal axis 22 (FIG. 2) of the aircraft 10 corresponds to the horizontal axis (when the aircraft 10 is on the ground) which extends from the nose 14 to the tail cone 16 of the aircraft 10. A longitudinal direction is a direction parallel to the longitudinal axis 22. A longitudinal plane is a plane comprising an axis that is parallel to the longitudinal axis 22. A transverse plane is a plane perpendicular to the longitudinal axis 22.

The concepts of front (Av) and rear (Ar) refer to the direction of flow of the air outside the aircraft in flight, which passes from the front to the rear.

Figure 2:
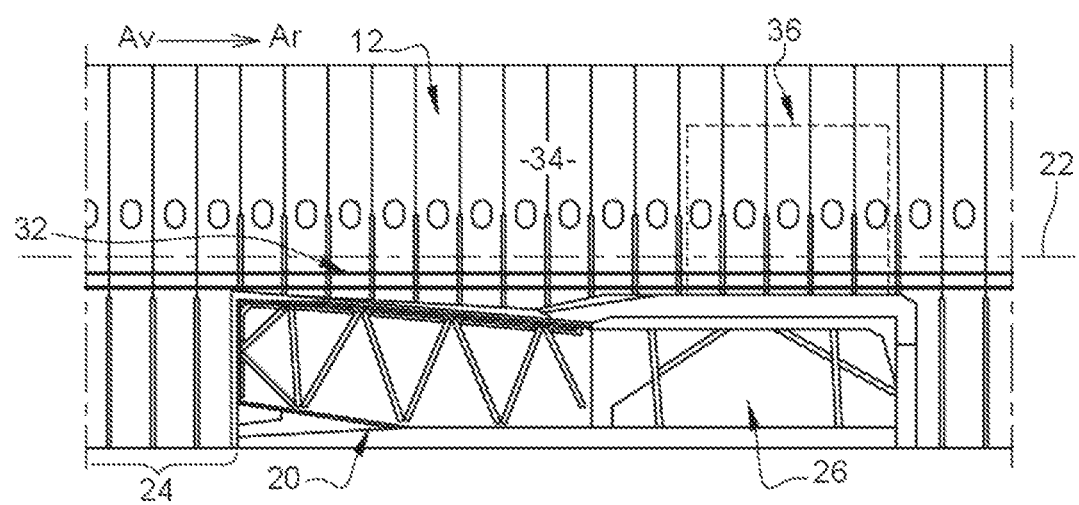
FIG. 2 is a longitudinal section through a part of the fuselage of the aircraft shown in FIG. 1.
Figure 3:
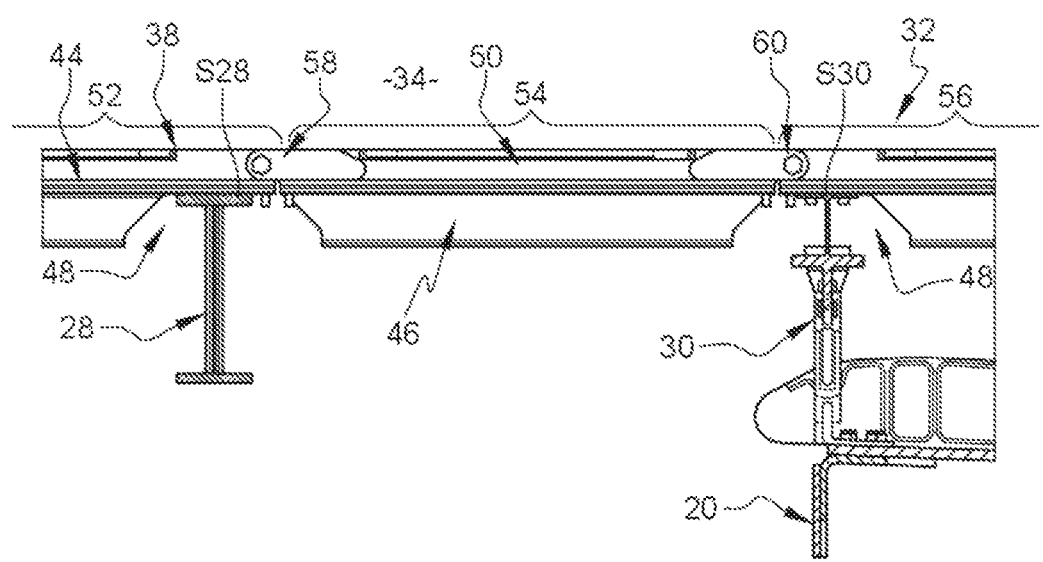
FIG. 3 is a side view of a part of a floor of a cabin of an aircraft, illustrating one embodiment of the disclosure herein.

As illustrated in FIGS. 2 and 3, the fuselage 12 also comprises a front fuselage portion 24 situated in front of the central wing box 20, a main landing gear bay 26 offset towards the rear with respect to the central wing box 20, at least one first transverse beam 28 secured to the front fuselage portion 24, at least one second transverse beam 30 secured to the central wing box 20, and a floor 32 that is positioned above the central wing box 20 and rests on the first and second transverse beams 28, 30.

According to an embodiment, the first transverse beam 28 has an I-shaped cross section. Of course, the disclosure herein is not limited to this cross section. Regardless of the embodiment, the first transverse beam 28 comprises a first upper transverse flange S28.

According to an embodiment, the second transverse beam 30 comprises a lower part with a T-shaped cross section and an upper part with an I-shaped cross section. Of course, the disclosure herein is not limited to this embodiment. Regardless of the embodiment, the second transverse beam 30 comprises a second upper transverse flange S30.

In flight, the central wing box 20 tends to move with respect to the rest of the fuselage 12, more particularly with respect to the front fuselage portion 24. Thus, the central wing box 20 may deform or pivot somewhat about a transverse and horizontal pivot axis with respect to the front fuselage portion 24.

According to an application, the region of the fuselage situated above the floor 32 forms a cabin 34 in which a load can be stored. The latter comprises at least one container 36 (represented by broken lines in FIG. 2). To make it easier to move the containers in the cabin 34, the floor 32 comprises at least one rail 38 parallel to the longitudinal direction, which extends above the central wing box 20 and in the front fuselage portion 24.

Figure 4:
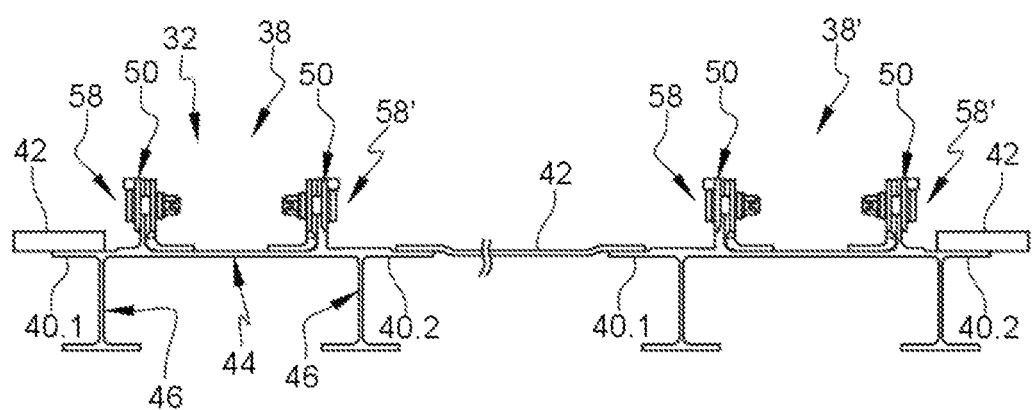
FIG. 4 is a cross section through a part of the floor of a cabin of an aircraft, illustrating one embodiment of the disclosure herein.
Figure 5:
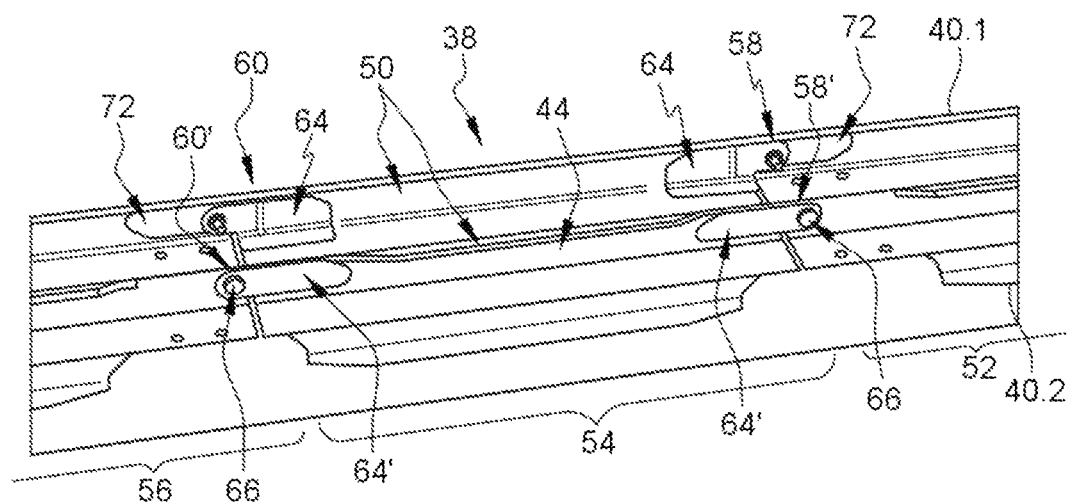
FIG. 5 is a perspective view of a rail of the floor shown in FIG. 4.

According to an arrangement shown in FIG. 4, the floor 32 comprises at least one pair of mutually parallel rails 38, 38'.

According to an embodiment, each rail 38, 38' comprises, on either side, horizontal extensions 40.1, 40.2 configured to support horizontal panels 42. Thus, the floor 32 comprises a plurality of rails 38, 38' that are spaced apart along the transverse direction, and horizontal panels 42 supported by the rails 38, 38', the rails 38, 38' delimiting between one another spaces closed off by the horizontal panels 42. As a result, the rails 38, 38' are integrated into the floor 32 and form a load-bearing structure for the horizontal panels 42. Thus, in contrast to the prior art, which provides floor panels that support the rails, the disclosure herein provides rails that support the floor panels.

The horizontal panels 42 can be made of different materials, such as wood, metal, composite material or the like.

Figure 6:
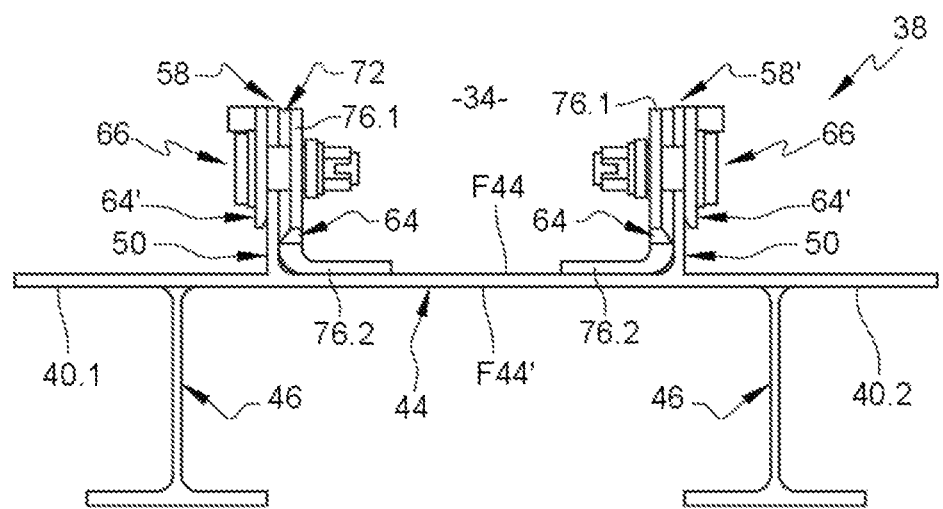
FIG. 6 is a cross section through the rail shown in FIG. 5.

According to an embodiment, shown in FIG. 4, the rails 38, 38' are identical. As illustrated in FIG. 6, each rail 38, 38' comprises a horizontal plate 44 which has an upper face F44 oriented towards the cabin 34, a lower face F44' oriented towards the central wing box 20, and lateral edges forming the horizontal extensions 40.1, 40.2. According to one configuration, the horizontal plate 44 is reinforced. In this case, the rail 38, 38' comprises at least one rib 46 positioned on the lower face F44' of the horizontal plate 44 and connected to the latter. By way of example, the rail 38, 38' has two ribs 46 with a profile in the shape of an inverted T. Each rib 46 is parallel to the longitudinal direction.

According to an arrangement, each rib 46 has a cutout 48 in line with the first and second transverse beams 28 and 30 such that the horizontal plate 44 rests on the first and second upper transverse flanges S28, S30.

Each rail 38, 38' has at least one core 50 that is substantially vertical and parallel to the longitudinal direction and extends from the upper face F44 in the direction of the cabin 34. Each core 50 has first and second faces 50.1, 50.2 (referenced in FIGS. 8 and 9). Each core 50 may have a cross section in the shape of an I, of an inverted L, of an inverted T or any other cross section. The horizontal plate 44 extends on either side of the core 50 or of the cores 50.

According to an application, the containers 36 have, in their lower part, rollers allowing them to roll. According to one arrangement, shown in FIG. 6, each rail 38, 38' has two mutually parallel cores 50 that are spaced apart from one another by a determined distance depending on the width of the rollers of the container 36.

According to an embodiment, the horizontal plate 44, the ribs 46 and the cores 50 are produced integrally. Thus, each rail 38, 38' is in the form of a profiled element with a substantially constant cross section.

Of course, the disclosure herein is not limited to this embodiment for the rails 38, 38'. Regardless of the embodiment, each rail 38, 38' has at least one core 50 configured to cooperate with the containers 36.

According to an embodiment, shown in FIG. 3, each rail 38, 38' comprises a plurality of rail portions 52, 54, 56 positioned end to end along the longitudinal direction. According to one arrangement, each rail 38, 38' comprises a front rail portion 52 secured to the front fuselage portion 24, a rear rail portion 56 secured to the central wing box 20, the front and rear rail portions being spaced apart from one another, and an intermediate rail portion 54 positioned between the front and rear rail portions 52, 56.

The front and intermediate rail portions 52, 54 are spaced apart by a small distance, of the order of a few millimeters. Similarly, the intermediate and rear rail portions 54, 56 are spaced apart by a small distance, of the order of a few millimeters.

The front and intermediate rail portions 52, 54 are connected by at least one front articulation 58. In parallel, the intermediate and rear rail portions 54, 56 are connected by at least one rear articulation 60. According to one configuration, each of the front and rear articulations 58, 60 is configured to allow a pivoting movement about a transverse and horizontal pivot axis between the two connected rail portions 52, 54, 56.

Of course, the disclosure herein is not limited to this embodiment. Regardless of the embodiment, the rail 38, 38' comprises at least first and second rail portions 52, 54, 56 among the front, intermediate and rear rail positions, which are positioned end to end along the longitudinal direction, one of them being connected to the front fuselage portion 24 or to the central wing box 20; and at least one articulation 58, 60 that connects the first and second rail portions 52, 54, 56 and is configured to allow a pivoting movement about a transverse and horizontal pivot axis between the first and second connected rail portions 52, 54, 56.

Figure 9:
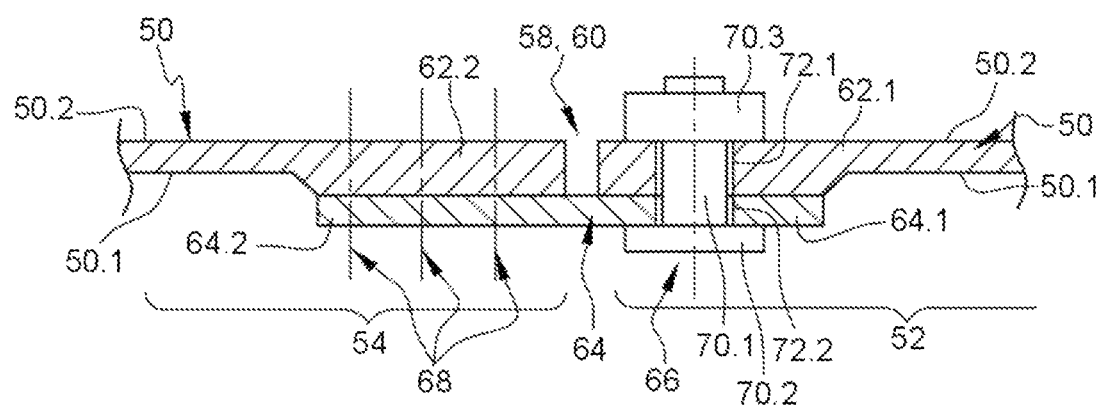
FIG. 9 is a longitudinal and horizontal section through an articulation connecting two rail portions, illustrating another embodiment.

According to the simplified embodiment shown in FIG. 9, the articulation 58, 60 connecting a first end 62.1 of the core 50 of the first rail portion 52 and a second end 62.2 of the core 50 of the second rail portion 54 comprises at least one splice plate 64 having a first end 64.1 pressed against the first or second face 50.1, 50.2 of the first end 62.1 of the core 50 of the first rail portion 52 and a second end 64.2 pressed against the right-hand or left-hand face 50.1, 50.2 of the second end 62.2 of the core 50 of the second rail portion 54, a pivot pin 66 that is oriented perpendicularly to the longitudinal direction and passes through the first end 62.1 of the core 50 of the first rail portion 52 and the first end 64.1 of the splice plate 64, and at least one first complete link 68 connecting the second end 62.2 of the core 50 of the second rail portion 54 and the second end 64.2 of the splice plate 64.

The pivot pin 66 comprises a cylinder 70.1, a first stop 70.2 positioned at a first end of the cylinder 70.1 and a second stop 70.3 positioned at a second end of the cylinder 70.1, the cylinder 70.1, the first and second stops 70.2, 70.3 being configured to keep the splice plate 64 pressed against the core 50 of the first portion 52. According to one embodiment, the pivot pin 66 is a bolt, the screw of the bolt corresponding to the cylinder 70.1 and to the first stop 70.2, the nut of the bolt corresponding to the second stop 70.3.

In addition, the first end 62.1 of the core 50 of the first rail portion 52 has a through-hole 72.1 configured to accommodate the pivot pin 66. In parallel, the first end 64.1 of the splice plate 64 has a through-hole 72.2 configured to accommodate the pivot pin 66.

The link 68 is a complete link obtained by adhesive bonding, bolting, crimping or any other assembly technique.

According to one embodiment, shown in FIG. 9, the articulation 58, 60 comprises a single splice plate 64. According to this embodiment, at least one of the ends from among the first and second ends 62.1, 62.2 of the core 50 of the first and second rail portions 52, 54 comprises an overthickness.

Figure 7:
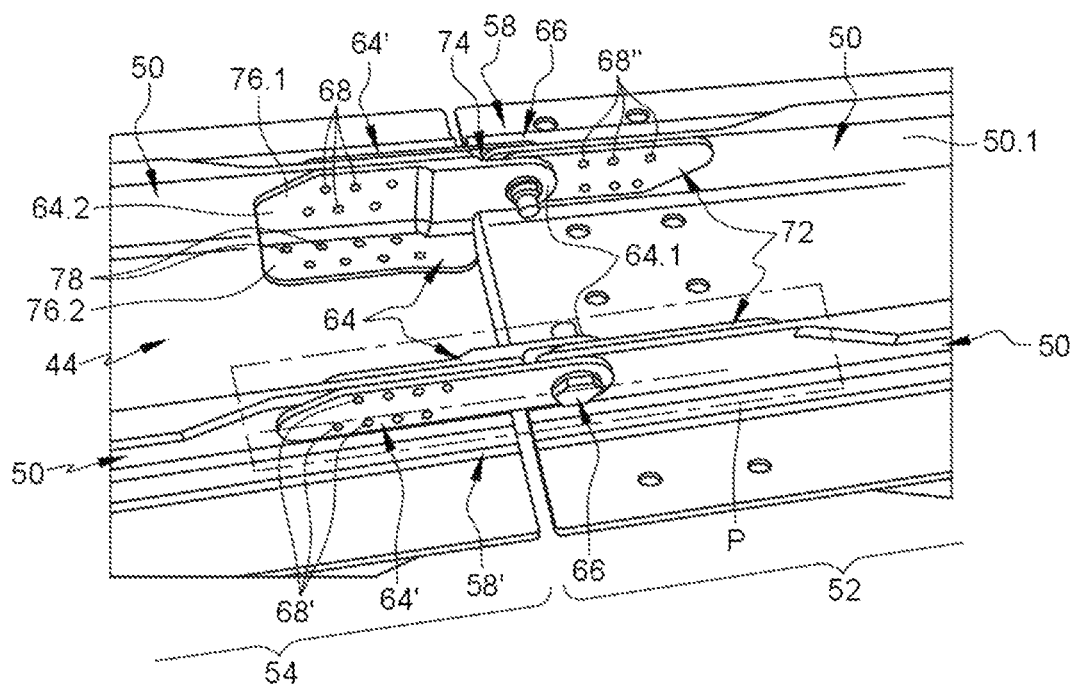
FIG. 7 is a perspective view of an articulation connecting two rail portions, illustrating one embodiment of the disclosure herein.
Figure 8:
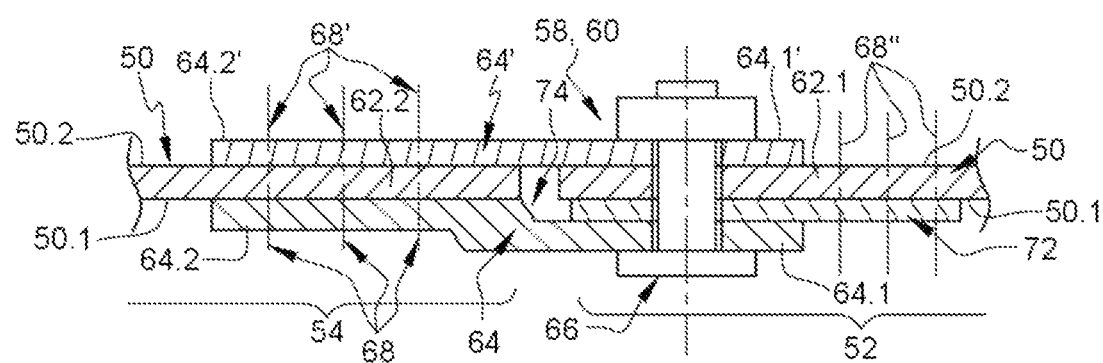
FIG. 8 is a longitudinal and horizontal section, on the plane P in FIG. 7, through the articulation shown in FIG. 7.

According to another embodiment, shown in FIGS. 7 and 8, the articulation 58, 60 comprises:
a backplate 72 pressed against the first face 50.1 of the first end 62.1 of the core 50 of the first rail portion 52,
a first splice plate 64 having a first end 64.1 pressed against the backplate 72 and a second end 64.2 pressed against the first face 50.1 of the second end 62.2 of the core 50 of the second rail portion 54,
a second splice plate 64' having a first end 64.1' pressed against the second face 50.2 of the first end 62.1 of the core 50 of the first rail portion 52 and a second end 64.2' pressed against the second face 50.2 of the second end 62.2 of the core 50 of the second rail portion 54,
a pivot pin 66 passing through the first end 62.1 of the core 50 of the first rail portion 52, the backplate 72 and the first ends 64.1, 64.1' of the first and second splice plates 64, 64',
at least one first complete link 68, connecting the second end 62.2 of the core 50 of the second rail portion 54 and the second end 64.2 of the first splice plate 64,
at least one second complete link 68', connecting the second end 62.2 of the core 50 of the second rail portion 54 and the second end 64.2' of the second splice plate 64',
at least one third complete link 68", connecting the backplate 72 and the first end 62.1 of the core 50 of the first rail portion 52.

The first and second links 68, 68' may form only one single link comprising bolts, rivets or the like passing through the second end 62.2 of the core 50 of the second rail portion 54 and the second ends 64.2, 64.2' of the first and second splice plates 64, 64'.

Further solutions are conceivable for the first and second links 68, 68' in order to obtain complete links.

The third link 68" is a complete link obtained by adhesive bonding, bolting, crimping or any other assembly technique.

The pivot pin 66 of the embodiment shown in FIGS. 7 and 8 may be identical to the one in the embodiment shown in FIG. 9.

The first splice plate 64 comprises a step 74 between its first end second ends 64.1, 64.2, in order to accommodate the backplate 72.

According to one embodiment, the second splice plate 64' is in the form of a plate. The first splice plate 64 comprises two wings 76.1, 76.2 that form an angle of around 90° and are produced integrally, a first wing 76.1 having a first end pressed against the backplate 72 and a second end pressed against the first face 50.1 of the second end 62.2 of the core 50 of the second rail portion 54, and a second wing 76.2 pressed against the horizontal plate 44 and connected to the latter by connecting elements 78. This second wing 76.2 is shorter than the first wing 76.1 so as not to extend beyond the second rail portion 54.

When the rail 38, 38' comprises two cores 50, it comprises first and second articulations 58, 58' (or 60, 60'), one for each core 50. These first and second articulations are symmetric with respect to a median plane parallel to the two cores 50 and positioned equidistantly from the two cores 50. When the first splice plate 64 of each of the first and second articulations 58, 58' (or 60, 60') comprises first and second wings 76.1, 76.2, the second wings 76.2 of the first splice plates 64 of the first and second articulations are positioned between the two cores 50.

When the rail 38, 38' comprises at least one front articulation 58, 58' and at least one rear articulation 60, 60', the front and rear articulations 58, 58', 60, 60' are symmetric with respect to a transverse plane situated equidistantly from the front and rear rail portions 52, 56, the backplates 72 of the front and rear articulations 58, 58', 60, 60' being connected by a third complete link 68" to the front and rear rail portions 52, 56, the first and second splice plates 64, 64' of the front and rear articulations 58, 58', 60, 60' having ends 64.2, 64.2' connected by first and second complete links 68, 68' to the core 50 or to the cores 50 of the intermediate rail portion 54.

Regardless of the embodiment, the rail 38, 38' comprises at least one core, at least first and second rail portions, at least one articulation 58, 60 connecting a first end 62.1 of the core 50 of the first rail portion 52 and a second end 62.2 of the core 50 of the second rail portion 54. This articulation 58, 60 comprises at least one splice plate 64 having first and second ends 64.1, 64.2, a pivot pin 66 passing through the first end 62.1 of the core 50 of the first rail portion 52 and the first end 64.1 of the splice plate 64, and at least one first complete link 68 connecting the second end 62.2 of the core 50 of the second rail portion 54 and the second end 64.2 of the splice plate 64.

This solution allows the rails to adapt to the movements and/or deformations between the different portions of the fuselage. Consequently, the rail can be integrated into the floor of the cabin 34, making it possible to optimize the available height between the rails and the ceiling of the cabin.

To reinforce the articulation, the latter may comprise a backplate 72 provided to reinforce the core 50 of a first rail portion and to transmit forces between the pivot pin 66 and this first rail portion.

It may comprise two splice plates 64, 64' disposed on either side of the cores of the first and second rail portions, these being provided to reinforce the core 50 of the second rail portion and to transmit forces between the pivot pin 66 and this second rail portion.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a central wing box;
a front fuselage portion that is positioned, along a longitudinal direction, in front of the central wing box; and
a floor positioned above the central wing box and in the front fuselage portion, the floor comprising at least one rail which extends along the longitudinal direction and has at least one core, wherein the at least one rail comprises:
a first rail portion;
a second rail portion, and
at least one articulation connecting a first end of the core of the first rail portion and a second end of the core of the second rail portion, the articulation comprising:
at least one splice plate having first and second ends,
a pivot pin oriented perpendicularly to the longitudinal direction, passing through the first end of the core of the first rail portion and the first end of the splice plate, and
at least one first complete link connecting the second end of the core of the second rail portion and the second end of the splice plate.

2. The aircraft of claim 1, wherein each articulation comprises first and second splice plates positioned on either side of the core of each of the first and second ends of the first and second rail portions, the first and second splice plates having first ends through which the pivot pin passes and second ends connected by at least one complete link to the second end of the core of the second rail portion.

3. The aircraft of claim 2, wherein the core of each of the first and second ends of the first and second rail portions comprises first and second faces, and wherein each articulation comprises a backplate pressed against the first face of the first end of the core of the first rail portion and connected to the first end by a complete link, the first end of the first splice plate being pressed against the backplate, the second end of the first splice plate being pressed against the first face of the second end of the core of the second rail portion and connected to the second end by a complete link, the first end of the second splice plate being pressed against the second face of the first end of the core of the first rail portion, the second end of the second splice plate being pressed against the second face of the second end of the core of the second rail portion and connected to the second end by a complete link, and the pivot pin passing through the first end of the core of the first rail portion, the backplate and the first ends of the first and second splice plates.

4. The aircraft of claim 3, wherein the first splice plate comprises a step between its first and second ends, in order to accommodate the backplate.

5. The aircraft of claim 3, wherein the rail comprises a horizontal plate which has an upper face on which the core is positioned, and wherein the first splice plate comprises first and second wings that form an angle of around 90° and are produced integrally, the first wing having a first end pressed against the backplate and a second end pressed against the first face of the second end of the core of the second rail portion, the second wing being pressed against the horizontal plate and connected to the latter by connecting elements.

6. The aircraft of claim 1, wherein the rail comprises two cores and first and second articulations, one for each core, which are symmetric with respect to a median plane parallel to the two cores and positioned equidistantly from the two cores.

7. The aircraft of claim 6, wherein the second wings of the first splice plates of the first and second articulations are positioned between the two cores.

8. The aircraft of claim 1, wherein the rail comprises a front rail portion, an intermediate rail portion, a rear rail portion, at least one front articulation connecting the front rail portion and the intermediate rail portion, and at least one rear articulation connecting the intermediate rail portion and the rear rail portion, the front and rear articulations being symmetric with respect to a transverse plane situated equidistantly from the front and rear rail portions.

9. The aircraft of claim 1, wherein the rail comprises a front rail portion connected to the front fuselage portion and a rear rail portion connected to the central wing box.

10. The aircraft of claim 1, wherein the floor comprises a plurality of rails spaced apart along a transverse direction perpendicular to the longitudinal direction, and horizontal panels supported by the rails, the rails delimiting spaces closed off by the horizontal panels.

* * * * *